United States Patent [19]

Moisset et al.

[11] Patent Number: 5,173,284
[45] Date of Patent: Dec. 22, 1992

[54] PROCESS FOR PREPARATION OF PURIFIED CALCIUM SULFATE IN AN AQUEOUS MEDIUM

[75] Inventors: Jacques Moisset, L'Isle-sur-la-Sorgue; Alain Petit, Montelimar, both of France

[73] Assignee: Lafarge Coppee, Paris, France

[21] Appl. No.: 527,373

[22] Filed: May 23, 1990

[30] Foreign Application Priority Data

May 23, 1989 [FR] France ............... 89 06704

[51] Int. Cl.$^5$ ........................... C01F 11/46
[52] U.S. Cl. ................... 423/555; 423/170; 23/304; 106/784
[58] Field of Search ............ 23/304; 106/783; 423/170, 555

[56] References Cited

U.S. PATENT DOCUMENTS

| | | | |
|---|---|---|---|
| 2,044,942 | 6/1936 | Heckert | 423/555 |
| 2,177,254 | 10/1939 | Heckert | 423/555 |
| 4,270,954 | 6/1981 | Aignesberger et al. | 106/47 R |
| 4,296,089 | 10/1981 | Aignesberger et al. | 423/555 |

FOREIGN PATENT DOCUMENTS

| | | |
|---|---|---|
| 2629069 | 9/1989 | France . |
| 55-3314 | 1/1980 | Japan ............... 23/304 |

OTHER PUBLICATIONS

"Recystallization of Calcium Sulfate Hemihydrate in Acid and Alkaline Media" V. F. Karmyshov and N. G. Frolova Translated from Zhurnal Prikladnoi Khimii, vol. 49, No. 12, pp. 2626–2629, Dec. 1976 Original Article Submitted Feb. 9, 1976.

Primary Examiner—Gary P. Straub
Assistant Examiner—Timothy C. Vanoy
Attorney, Agent, or Firm—Oblon, Spivak, McClelland, Maier & Neustadt

[57] ABSTRACT

A process for the preparation in an aqueous medium of purified calcium sulfate, with high whiteness, characterized in that it comprises:
a) the formation of an aqueous solution by dissolution of impure hemihydrated calcium sulfate, at a concentration at most of 13.0 grams per liter (expressed in dissolved CaSO$_4$) and at a pH of at least 5.5,
b) the separation of the aqueous solution containing the dissolved calcium sulfate from the insoluble solid phase formed by the impurities to be removed,
c) the recrystallization of the purified calcium sulfate in dihydrated form from the aqueous solution resulting from step (b), possibly in the presence of a seeding primer placed in the reaction medium,
d) the separation after recrystallization of the aqueous phase poor in dissolved calcium sulfate from the solid phase composed of the recrystallized purified calcium sulfate,
e) the recycling of the aqueous phase poor in dissolved calcium sulfate back to step (a) for dissolving impure calcium sulfate, yields calcium sulfate having at will the appearance of polymorphous or longilinear monomorphous crystalline structures.

The purified crystalline structures obtained in accordance with the process are intended more particularly for fields of use as varied as cements and plasters and, more especially, for those of paper, paint and plastics.

28 Claims, 4 Drawing Sheets

PROCESS FOR PREPARATION OF PURIFIED CALCIUM SULFATE IN AN AQUEOUS MEDIUM

BACKGROUND OF THE INVENTION

1. Field of the Invention

The present invention relates to a process for preparing purified calcium sulfate in an aqueous medium from natural or synthetic impure calcium sulfate.

The invention also relates to the polymorphous crystalline structures of purified calcium sulfate resulting from the process, without a controlled shape factor.

The invention also relates to the longilinear monomorphous crystalline structures of purified calcium sulfate resulting from the process, with a controlled length and shape factor.

2. Discussion of the Background

As used herein, the phrase "polymorphous crystalline structures" designates the field composed of individualized crystals which appear in the mixture both as needles with a very varied length and diameter, scales (twin crystals), polycrystalline aggregates and other crystalline structures.

The phrase "longilinear monomorphous crystalline structures" designates the field composed of individualized crystals which appear in the form of needles, or indeed composed of said crystals connected in threes at most along their large axis by partial covering, with a controlled length and shape factor.

Finally, the phrase "shape factor" is intended to define the size ratio existing between the length of the individual crystal or crystals connected in threes at most, and their largest diameter.

For a long time, dihydrated calcium sulfate, in the chemical form more commonly known by the name "gypsum", with the formula $CaSO_4, 2H_2O$, has been the source of raw material for the production of plasters ("alpha" or "beta" varieties of semihydrated calcium sulfate commonly known by the name "hemihydrate", with the formula $CaSO_4 \frac{1}{2} H_2O$) resulting from its heat treatment (dry or in the presence of water in liquid or vapor form) between 90° C. and 250° C.; and for the production of anhydrites, I, II and III (with the formula $CaSO_4$), with one being called soluble (anhydrite III) when the treatment is carried out at a temperature selected within the range of 100° C. to 250° C., and the others being called insoluble when the heat treatment exceeds the temperature of 250° C. (anyhydrite II or overburned) or 1200° C. (anhydrite I).

The gypsum used for these heat transformations can be natural, in which case it is removed from fossil deposits, or indeed of synthetic origin and, consequently, it can be phosphogypsum, desulfogypsum or gypsum from chemical neutralization in certain industrial processes.

Whether it is of natural or synthetic origin, the gypsum contains impurities which are more or less of a nuisance and which are perpetuated in the various chemical forms resulting from its heat transformation.

The most common impurities are, for example, organic compounds which as humic acids, simple inorganic compounds, such as halogenides, sulfates, calcium carbonate, magnesium carbonate, strontium carbonate, radium carbonate (and other carbonates), and also complex inorganic compounds such as clays, sodium fluosilicate, aluminum fluosilicate and calcium fluosilicate (A.V. SLACK, Fertilizer Science and Technology Series—Volume 2, Phosphoric acid, part 2, Marcel DEKKER, Inc., New York, 1986, pp. 531 and 643; K KAJI and T. TSUDA, Sekko to Sekkai, N. 48, 1960, p. 162-Ref.: Chemical Abstracts, Volume 55, 1961, 9830)), or even of the $Ca_4AlSiSO_4F_{12}OH \cdot 12H_2O$ or $Ca_4AlSiSO_4F_{13} \cdot 12H_2O$ types (L.P. YERMILOVA, V.A. MOLEVA and R.V. FLEVTSOVA, ZAl; Vsesoyuzn. Miner. Obshsh., 89, 15 (1960, Russian); J.R. LEHR, A.W. FRAZIER and J.P. SMITH, J. Agric. and Fd. Chem., 14, 27 (1966)), radioactive components, $P_2O_5$ and fluorophosphates $FPO_3^-$). These impurities are for the most part insoluble or minimally soluble in water and thus require large amounts of water to dissolve them and remove them in this form.

Moreover, the presence of at least certain impurities in numerous natural or synthetic gypsums compromises the use of said gypsums as a source of raw materials in heat transformation processes, because these impurities can be at the origin of numerous harmful effects, for example on the setting kinetics of the plaster, on the lack of whiteness of the various chemical and crystalline forms of calcium sulfate (through heat transformation of the gypsum) when these various forms are intended to play a role of white pigmentary changes, or even on the appearance of the crystalline structures themselves, the control of the morphology and/or of the shape factor of which can be upset or even irreversibly compromised, and finally on the polluting and possibly troublesome aspect of radioactivity.

All of the interest in such a source of raw material is perceived as soon as its non-use appears as a large economic loss, both for natural and for synthetic gypsum, and as a major risk of pollution, since synthetic gypsums are presently stocked in thousands of tons in quarries and dumps or are dumped into streams and/or rivers, with rejects into running water becoming unacceptable due to the risks of eutrophization of said water.

This is why impure gypsums have been, as shown by the specialized literature, at the root of numerous descriptions of methods for purification and transformation into saleable products, with each process seeking to make its contribution to the fight against pollution, to the valorization of impure gypsums and to the control of the conditions for the removal of a certain impurity or of certain impurities.

A first type of purification process proposes removing the impurities from a source of hemihydrated calcium sulfate by solubilizing them in a chemically neutral liquid phase, through washing with spring water, following by a rapid separation of the washing liquor and almost immediate use of the purified hemihydrated calcium sulfate. Such a process, which is intended for the production of a purified hemihydrated calcium sulfate and which is illustrated by French Patent 2,359,692, consists of rapidly washing at a low temperature (between 0° C. and 30° C.) impure hemihydrated calcium sulfate coming from the heat transformation of a natural gypsum containing water-soluble impurities such as chloride, calcium sulfate and magnesium sulfate.

However, while this first type of method is intended to provide purified hemihydrated calcium sulfate, it has the major disadvantages of being able to be used only on hemihydrated calcium sulfates in which the impurities are water-soluble.

A second type of purification process proposes, as in the first type, using impure hemihydrated calcium sulfate and is distinguished from the preceding process by the essential fact that it apparently seeks to solubilize, in a strongly acidified aqueous phase, the impurities which are claimed to be insoluble in water.

A process of this second type is described in French Patent 2,064,195. It consists of treating the impure hemihydrated calcium sulfate, in a highly concentrated aqueous suspension (50 grams per liter to 650 grams per liter), with an acid agent by adjusting the pH of said suspension to a value preferably lower than 1.5 (to cause the impurities to dissolve), of maintaining the temperature of the suspension at a level selected within the range of at least 5° C. to 60° C., with the treatment being carried out in the presence of at least one organic agent, and of carrying out a hydroseparation of the solid phase at the end of the treatment.

A process of this type has disadvantages which can render its use unrealistic and raising doubts as to its industrial character, because the acid treatment of the aqueous suspension which is highly concentrated in impure material:
- can achieve only a selective dissolution of the impurities since it yields a product having a degree of whiteness of 90.5 percent at best (Example 2),
- causes the rapid saturation in dissolved impurities of the liquid phase and the risk of reprecipitation of said impurities into the solid phase,
- requires a subsequent washing of the purified solid phase to remove the acid impregnation mother waters therefrom,
- is a source of environmental pollution due to the inevitable rejection of the liquid acid phase which is saturated with impurities, washing waters and organic liquids such as hydrocarbons,
- is economically disadvantageous due to its high consumption of water, acid reagents and possibly reagents for neutralizing the liquid effluents.

A third type of purification process, which is distinguished from the other types, consists of solubilizing the impure gypsum, in a hot acid solution in which the impurities are, for the most part, insoluble, then of separating the impurities and of recrystallizing the purified gypsum by cooling of the calcium sulfate-rich solution.

A process of this last type is described in U.S. Pat. No. 3,642,456 and comprises the successive steps of dissolving the impure gypsum in a solution of fluosilicic acid (at a concentration of 15 percent to 26 percent of $H_2SiF_6$) brought to a temperature of 70° C. to 90° C., separating at the same temperature the liquid phase and the solid phase composed of the insoluble impurities, cooling the liquid phase to a temperature of approximately 27° C. to 33° C. to cause the precipitation of the purified gypsum, and finally washing said gypsum to remove the acid solution therefrom.

However, this process, like the preceding ones, has certain disadvantages which render it difficult to use industrially.

Firstly, the hot aqueous solutions of fluosilicic acid used the process can cause serious corrosion phenomena which would require, in order to combat them, complex and very expensive installations.

In addition, the hot aqueous solutions dissolve, at least in part, the impurities which cocrystallize with the purified gypsum during the required cooling of the recrystallization solution.

Moreover, the aqueous acid solutions become a source of environmental pollution since they must be removed by a subsequent washing of the recrystallized purified gypsum which they impregnate.

Finally, the process appears to have no economic interest due to its high consumption of washing water which must be replaced, of acid reagents and possibly of reagents for neutralizing the liquid effluents, and due to its high energy consumption which is related to the consequent temperature variations used.

Therefore, although the prior art has recommended, through numerous publications, means to be used for preparing purified calcium sulfate from various sources of impure calcium sulfate, these means have been shown to be difficult to use on an industrial scale (process of type I), strong environmental polluters, large consumers of water, acids and neutralizing agents, and frequently to have little effect since they select certain impurities at the origin of the precipitation and/or the cocrystallization of the impurities which are initially solubilized with the purified calcium sulfate (processes of types II and III).

For this reason, it appeared necessary for the field of purification of calcium sulfate to have effective, economical and non-polluting means.

SUMMARY OF THE INVENTION

Thus, the objects of the invention are to isolate and remove the impurities without solubilizing them so as to prevent environmental pollution through the rejection of the dissolution liquid of said impurities, to exclude the use of a really acid treatment medium because such generates subsequent pollutions and consumes large quantities of washing water, to create an economical process in new water while working at a very lower concentration of dry material, and of producing very white calcium sulfate, with low radioactive contamination in the case of phosphogypsum, having, on demand, the appearance of polymorphous or longilinear monomorphous crystalline structures, with in the second case, a controlled length and shape factor.

Aware of the importance of the above-indicated disadvantages, applicants have sought, through their research, to create a process for the preparation in an aqueous medium of purified calcium sulfate corresponding to the designated objectives.

These and other objects, which will become apparent during the course of the following detailed description have been achieved by a process comprising:
a) the formation of an aqueous solution by dissolving impure hemihydrated calcium sulfate at a concentration at most of 13.0 grams per liter (expressed in dissolved calcium sulfate) and at a pH of at least 5.5,
b) the separation of the aqueous solution containing the dissolved calcium sulfate from the insoluble solid phase formed by the impurities to be removed,
c) the recrystallization of the purified calcium sulfate in dihydrated form from the aqueous solution resulting from step (b), possibly in the presence of a seeding primer introduced into the reaction medium,
d) the separation, after recrystallization, of the aqueous phase containing a reduced amount of dissolved calcium sulfate from the solid phase composed by the recrystallized purified calcium sulfate, and
e) the recycling of the aqueous phase containing a reduced amount of dissolved calcium sulfate back to step (a) for dissolving impure calcium sulfate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Thus, the process in accordance with the invention is distinguished from those described in the prior art by the fact that it carries out a dissolution of the impure calcium sulfate and not of the impurities, that this dissolution takes place in an aqueous phase having a pH of at least 5.5 which is insufficiently acidic to prime the dissolution of the impurities, that the recrystallization of the purified dihydrated calcium sulfate takes place at a temperature close to that of the dissolution step, thus eliminating any action for cooling the solution which is rich in dissolved calcium sulfate, and that finally the aqueous phase collected after the recrystallization step is recycled to the step in which the impure calcium sulfate is dissolved, providing in this manner a remarkable overall recrystallization yield, a very low water consumption and an absence of environmental pollution through the absence of dumping liquid effluents.

In accordance with the process of the invention, the raw material to be used is composed of impure hemihydrated "beta" and/or "alpha" calcium sulfate resulting from the heat treatment of natural or synthetic gypsum, such as phosphogypsum, desulfogypsum, gypsum resulting from chemical neutralization using means known to the skilled artisan, with said hemihydrated calcium sulfate being taken at the exit of the gypsum heat transformation zone immediately after the heat treatment. However, when the raw material is formed of hemihydrated "alpha" calcium sulfate, it can be taken directly from the phosphate mineral treatment, using specific methods which are well known to the skilled artisan.

Where the raw material contains particularly troublesome water-soluble impurities, such as $P_2O_5$ and/or calcium fluorophosphates, before using it, it may be desirable to carry out a purification pretreatment, for example such as hydrocycloning or other means known to the skilled artisan.

In accordance with a first alternative embodiment, when they are removed immediately after the gypsum heat treatment, the particles of impure hemihydrated calcium sulfate are selected such that their granular cross-section is 10,000 micrometers at most, preferably 5,000 micrometers at most, and most preferably 1,500 micrometrs at most, with the above-identified granular cross-sections being normally obtained in a known manner, either by mechanical action on the gypsum before and/or during its heat transformation, or on the hemihydrated calcium sulfate by removal of particles which are too large.

Thus, the impure hemihydrated calcium sulfate particles constituent of the raw material can be used in the process of the invention immediately after the heat treatment or even after more or less substantial cooling. In addition, during its use the raw material can be at a temperature within the range of 150° C. to 15° C.

In accordance with a second alternative, which enables the dissolution kinetics of the hemihydrated calcium sulfate in the aqueous medium to be increased, the particles of said impure hemihydrated calcium sulfate undergo a grinding and/or selection operation, such that the ground particles have a defined, specific granular cross-section.

In general, the particles of ground and/or selected impure hemihydrated calcium sulfate have a specific granular cross-section selected within the range of 5 micrometers to 500 micrometers, preferably in the range of 5 micrometers to 200 micrometers, and most preferably in the range of 5 micrometers to 100 micrometers.

The grinding and/or selection of the impure hemihydrated calcium sulfate particles is carried out by means known to the skilled artisan, such as through the use of hammer grinders, ball mills, finger mills, or others, in a dry or controlled atmosphere, and/or static or dynamic selectors, such as for example, with fixed blades, rotors, or others.

Thus, the ground and/or selected impure hemihydrated calcium sulfate particles can be used, in accordance with the process of the invention, immediately after the grinding and/or the selection, or after a more or less prolonged rest period causing controlled airing (or ageing) of said particles, as is well known to the skilled artisan.

During the industrial application of the process in accordance with the invention for obtaining purified calcium sulfate, an aqueous solution of hemihydrated calcium sulfate is used; this aqueous solution of calcium sulfate can be prepared by dissolving the powdered solid phase formed by the impure calcium sulfate, or can be an existing aqueous solution of calcium sulfate from an industrial process as the sub-product to be valorized.

In the case of the formation of the aqueous solution of calcium sulfate, this is carried out by the preparation of a suspension of impure hemihydrated calcium sulfate in the aqueous liquid phase.

The aqueous solution of calcium sulfate used in the process generally has a pH selected in the range of 5.5 to 13.

The aqueous liquid phase is generally at a temperature such that the aqueous solution of calcium sulfate thus formed is at a temperature of 70° C. at most.

When the raw material is hot, the aqueous solution can be prepared by dissolving into the liquid phase the powdered solid phase which can be at a temperature above the dissolution temperature which is fixed at 70° C. at most in the process in accordance with the invention.

The nature of the water used as the liquid phase in the formation of the aqueous solution is not fundamentally important with regard to the control of the process, but it may be desirable to use distilled or demineralized water, although any available water can be used without considerable changes occurring in the adjustments of the other parameters of the process.

During its formation, the aqueous solution of hemihydrated calcium sulfate undergoes sufficient stirring to prevent the sedimentation of said sulfate, to promote its dissolution in step (a), and to facilitate the preparation of crystalline structures of purified dihydrated calcium sulfate in step (c) in accordance with the invention.

The concentration of the aqueous solution formed in this manner expressed in grams of calcium sulfate dissolved per liter of dissolution water can vary preferably between 11 grams per liter and 6 grams per liter, with said concentration being measured by the amount of calcium ions present in the solution (inductive coupled plasma).

Depending on the desired concentration of calcium sulfate dissolved in the aqueous phase, the dissolution temperature, which must not exceed 70° C., is preferably selected in the range 0° C. to 50° C., and most preferably in the range 0° C. to 35° C., it being understood that said temperature is selected in the low values of said ranges, when it is desirable to promote obtaining an aqueous solution with a higher concentration of dissolved calcium sulfate.

In practice, the dissolution temperature is selected in the above-identified field in a manner such that dissolving the hemihydrated calcium sulfate in the aqueous phase takes place at the minimum temperature and within a desirably short time.

Depending on whether the ground hemihydrated calcium sulfate used as the raw material has a reactivity such that the kinetics of dissolution in the aqueous phase are too rapid, it may be interesting in the method in accordance with the invention to use during the dissolution step at least one agent for retarding recrystallization, with the presence of such an agent having the property of artificially increasing the time available for carrying out the dissolution without taking the risk of recrystallization which is too premature. Such an agent is preferably selected from the group composed of degraded proteins, water-soluble carboxylic acids and their salts, phosphonic acids and their salts, phosphoric acids and their salts, sulfonic acids and their salts and glucoses.

The operation of dissolving the impure hemihydrated calcium sulfate is normally carried out in one step, whether the process in accordance with the invention is practiced in a continuous or discontinuous manner. However, in certain cases, such as those for example where the impure hemihydrated calcium sulfate used causes slow dissolution kinetics (related to its firing method, its grain size, to its airing or to the presence of an agent for retarding crystallization), it may be interesting to carry out the dissolution by successive steps between which liquid/solid separations are carried out, or even to recycle, at the beginning of the dissolution step, the undissolved solid phase, while carrying out in sequences purges to remove the impurities.

At the end of the dissolution of the impure hemihydrated calcium sulfate, an aqueous suspension of a solid phase appears, which is composed of the impurities to be removed in a liquid phase containing the dissolved calcium sulfate and certain water-soluble impurities, which phases undergo a physical separation.

The physical solid/liquid separation of the particles of impurities is carried out using means known to the skilled artisan, such as for example, filtration, decantation, centrifuging, flocculation, etc.

At the end of this solid/liquid separation, the liquid phase collected containing the dissolved calcium sulfate in solution comprises the reaction medium for recrystallization of the purified dihydrated calcium sulfate.

The presence of certain water-soluble impurities, such as alkaline salts, in the recrystallization reaction medium does not risk perturbing the recrystallization of the dihydrated calcium sulfate, since the impurities are highly diluted and belong to the group of recrystallization regulating agents.

The process in accordance with the invention also includes the presence, in the reaction medium composed of the aqueous solution of calcium sulfate, of a seeding primer which is capable of entering into the kinetics of the formation of crystalline structures of recrystallized dihydrated calcium sulfate, with said seeding primer preferably being composed of calcium sulfates, calcium and potassium double sulfates, calcium and ammonium double sulfate and calcium trisulfoaluminate, taken alone or in combination.

Where it is desirable for subsequent uses that purified recrystallized dihydrated calcium sulfate has a monomorphous crystalline structure, the seeding primer is preferably added under the desired morphology, that is in the form of a possibly selected and/or ground longilinear crystalline structure.

However, where it is not necessary for the purified recrystallized dihydrated calcium sulfate to have a monomorphous structure, the possibly ground seeding primer can have any polymorphous structure whatsoever.

The process in accordance with the invention can also contain at least one recrystallization regulating agent which is distinct from the above-identified seeding primer and which also has the property of entering the formation kinetics of the crystalline structures of purified calcium sulfate.

Depending on the choice of recrystallization regulating agent, it is possible for form longilinear monomorphous crystalline structures with a controlled length and shape factor, by using a hydroreaction medium developing from a slightly acid, even neutral pH to an alkaline pH. Thus, the recrystallization regulating agent can be selected from among the additives having little or no influence on the pH of the aqueous recrystallization solution due to their chemically neutral character or having a marked influence on the pH due to their purely alkaline character.

When it is not desirable to form monomorphous purified crystalline structures, but rather to produce polymorphous purified crystalline structures, the recrystallization regulating agent can be selected in particular from the group composed of the salts of monovalent or polyvalent metals, and preferably among the halogenides, the sulfates, the nitrates, the silicates and the halogenosilicates of lithium, sodium, potassium, ammonium, calcium, magnesium or aluminum, alone or in combination.

In practice, the most favorable conditions for obtaining polymorphous crystalline structures are such tha the pH of the recrystallization solution is between 5.5 and 9.

On the other hand, when it is desirable to form longilinear monomorphous crystalline structures having a controlled length and shape factor, the recrystallization regulating agent can be selected in particular from the group composed of alkaline hydroxides, ammonium hydroxide, alkaline earth hydroxides, magnesium or calcium hydroxides, Portland cements, aluminous cements, calcium aluminate, alkaline aluminates or aluminosilicates, alone or in combination.

In certain cases, it may be desirable, even preferable, to combine two recrystallization regulating agents from each of the above-identified groups with a view to controlling even further the dimensions of the longilinear monomorphous crystalline structures during formation, and thus to play on the length and the shape factor of the longilinear structures.

The recrystallization regulating agent is generally added at a rate of 0.01 gram per liter to 3.0 grams per liter of the aqueous recrystallization solution, and preferably from 0.1 gram per liter to 0.75 grams per liter.

In practice, the most favorable conditions for obtaining longilinear monomorphous crystalline structures are such that the pH is between 9 and 13, with the recrystallization being carried out in the presence of a seeding primer having the same crystalline structure.

The temperature of the recrystallization solution is not a determining parameter of the method in accordance with the invention. In practice, the temperature of said recrystallization solution is selected to be close to the temperature of the dissolution solution, that is, preferably between 0° C. and 50° C. and most preferably between 0° C. and 35° C.

Other agents, with various functions and known to the skilled artisan, can also be added to the recrystallization solution at the most appropriate time, such as for example dispersing agents having the property of preventing the agglomeration of the crystalline structures being formed and of promoting their regular development.

Now and contrary to the teaching of the prior art recommending purification hydroreaction media which are acidic and highly concentrated in the calcium sulfate to be purified, it has appeared in an unexpected manner that it is possible to form crystalline structures of purified calcium sulfate, which are polymorphous or longilinear monomorphous at will, due to a hydroreaction medium with a very low content of dissolved calcium sulfate, developing from a neutral pH to an alkaline pH and maintained at a practically constant and notably low temperature, and providing an excellent yield.

At the end of the hydroreactive transformation, purified crystalline structures of dihydrated calcium sulfate are obtained with a good yield in the transformation of the impure hemihydrated calcium sulfate used.

In general, the recrystallized solid phase obtained in this manner is separated from the recrystallization solution.

On the other hand, for certain subsequent applications, the recrystallized solid phase can be replaced in an aqueous suspension without any damage to the crystalline structures, in particular when said structures are longilinear monomorphous ones.

The separation of the recrystallized solid phase can be carried out by any known means, such as decantatation, filtration under pressure or under a vacuum, hydrocycloning, electrophoresis, centrifuging, etc.

The aqueous phase obtained during the liquid/solid separation, which still contains calcium sulfate and certain water-soluble impurities in solution, can be recycled during the step of forming the aqueous solution of hemihydrated calcium sulfate by adding the amount of water necessary to compensate for the losses during the separation and by carrying out, through addition, the corrections in concentration of the various agents which may or may not occur in the process in accordance with the invention.

The solid phase collected at the end of the separation of the liquid/solid phases is formed from purified, highly individualized crystalline structures. The crystalline structures which are polymorphous or longilinear monomorphous at will require neither heat stabilization nor protective coating, as recommended by the prior art, and, when put in the presence of calcium sulfate-saturated water, they retain all their characteristics and in particular their controlled length and shape factor.

The longilinear monomorphous crystalline structures produced using the process in accordance with the invention are composed of individualized crystals or of crystals which are combined in threes at most along their large axis by partial covering. In accordance with the application, said structures have an average length of between 2 micrometers and 200 micrometers, low length dispersion and a controlled shape factor (ratio of the average length to the largest apparent average diameter) which can be varied at will in the range of 2/1 to 50/1.

The crystalline structures of purified dihydrated calcium sulfate can be thermally transformed, if such is desirable for certain applications, into crystalline structures of hemihydrated calcium sulfate when the heat treatment is carried out at a temperature of between 90° C. and 250° C., or even insoluble anhydrites when the heat treatment exceeds the temperature of 250° C. (anhydrite II or overburned) or of 1200° C. (anhydrite I), with said crystalline structures retaining at the end of the heat treatment all the size characteristics, in particular length and shape factor, possessed by the dihydrated structures before the heat treatment.

The purified polymorphous crystalline structures in accordance with the invention can be used in numerous industrial fields, for example in cements, in the production of plasters, etc.

On the other hand, the purified monomorphous crystalline structures in accordance with the invention can be used in numerous industrial fields when their controlled length and shape factor permit them to act, for example, as reinforcement in certain materials or as fillers in other materials in order to improve the mechanical, optical or heat characteristics or the surface appearance, etc., thereof.

The purified crystalline structures in accordance with the invention, whether polymorphous or longilinear monomorphous, have an exceptional whiteness which, measured using standard DIN 5033 on purified and reground crystalline structures (using a granular cross-section of less than 50 micrometers), is at least 97 percent (whiteness of the titanium dioxide pigment: approximately 96 percent).

Thus, because the purified crystalline structures in accordance with the invention have qualities as varied as light weight, very high whiteness, opacity, shine and ease of dispersion, they are intended more especially for fields of application as varied as those of cements and plasters, as well as those of paper, paint and plastics, with said structures capable, prior to their use, of undergoing a treatment which is appropriate for each field of use, such as for example modification of the pH, surface treatment or other treatments which are well-known to the skilled artisan.

Other features of the invention will become apparent in the course of the following descriptions of exemplary embodiments which are given for illustration of the invention and are not intended to be limiting thereof.

EXAMPLES

Example 1

This example has the object of illustrating, through obtaining purified dihydrated calcium sulfate, the technical progress and inventive activity of the process in accordance with the invention through providing, using recrystallization, a calcium sulfate having a high degree of purity.

In this spirit, several experiments (Nos. 1.1 to 1.6) were conducted in which the raw material was impure hemihydrated calcium sulfate coming both from natural gypsum of various origins and from synthetic gypsum (phosphogypsum and desulfogypsum).

For each experiment and in accordance with the process of the invention, an aqueous solution of calcium sulfate was prepared by dissolving impure hemihydrated calcium sulfate having a granular cross-section of less than 200 micrometers in the aqueous phase which was maintained under stirring. The aqueous solution of calcium sulfate had a concentration of approximately 8.4 grams per liter (expressed in dissolved calcium sulfate). The dissolution medium was maintained at a temperature of 15° C. and its measured pH was 6.

At the end of the dissolving operation, the aqueous solution containing the dissolved calcium sulfate was separated (using a frame filter) from the insoluble solid phase formed by the impurities to be removed.

The separated aqueous solution of calcium sulfate was then seeded by means of a ground (having a granular cross-section of less than 60 micrometers) gypsum primer (approximately 1.3 grams per liter) in order to initiate the recrystallization of the purified dihydrated calcium sulfate. At the end of one hour of recrystallization, the purified dihydrated calcium sulfate was collected (approximately 6.8 grams per liter out of the primer).

The whiteness and the purity of the sources of impure gypsum, of the hemihydrated calcium sulfate to be purified coming from the heat transformation of gypsum sources, and of the gypsum purified in accordance with the process of the invention were measured using the protocol described in standard DIN 5033 (whiteness), with the purity being measured by determining the content of $SO_3$.

The whiteness and purity results specific to each experiment are assembled in Table A below.

TABLE A

| Experiment No. | Source of gypsum (Ca SO4,2H2O) to be purified (granular cross-section 200μ) | | | Ca SO4,½H2O to be purified coming from the heat transformation of the gypsum source (granular cross-section 200μ) | | Gypsum (Ca SO4, 2H2O) purified in accordance with the process | | | |
|---|---|---|---|---|---|---|---|---|---|
| | | | | | | After recrystallization and no regrinding | | After recrystallization and regrinding <50μ | |
| | Origin and impurities in % | Whiteness Beta in % | Intensity Coloration P in % | Whiteness Beta in % | Intensity coloration P in % | Whiteness Beta in % | Intensity Coloration P in % | Whiteness Beta in % | Intensity Coloration P in % |
| 1.1 | Vaucluse 15 | 70.0 | 8.5 | 77.7 | 4.2 | 94.9 | 1.7 | 97.3 | 1.1 |
| 1.2 | Villiers-Adam 4 | 85.6 | 8.8 | 91.6 | 4.9 | 98.6 | 1.0 | 99.0 | 1.0 |
| 1.3 | Le Pin 12 | 80.0 | 9.0 | 85.2 | 5.5 | 96 | 1.5 | 97.6 | 1.0 |
| 1.4 | Phosphogypse France 4 | 75.2 | 10.6 | 80.2 | 7.0 | — | — | 98.2 | 1.0 |
| 1.5 | Desulfogypse France 8 | — | — | 76.3 | 10.0 | 96.7 | 1.6 | 97.1 | 1.4 |
| 1.6 | Phosphogypse Jakarta 3 | — | — | 89.3 | 3.2 | 97.0 | 1.0 | 97.8 | 0.9 |

These results show that the crystalline structures obtained in accordance with the invention, within the framework of each experiment, are (on microscopic observation) polymorphous, have high whiteness and excellent purity in comparison with the known art (FR 2,064,195 - Example 2: degree of whiteness=90.5 percent).

The qualitative and quantitative analysis of the impurities present in the source of calcium sulfate (impure hemihydrate) and in the recrystallized dihydrated calcium sulfate resulting from the application of the process in accordance with the invention, confirms the high purity of the recrystallized calcium sulfate and, therefore, its high whiteness.

Thus, Table B below shows the impurities present (in the case of Experiment 1.3) in the impure hemihydrated calcium sulfate and in the purified dihydrated calcium sulfate resulting from the application of the process in accordance with the invention.

TABLE B

| | % by weight of impurities present | |
|---|---|---|
| Impurities present | in the source of semi-hydrated calcium sulfate to be purified | in the recrystallized dihydrated calcium sulfate in accordance with the invention |
| SiO2 | 2.53 | 0.130* |
| Al2 O3 | 0.10 | < threshold of detection |
| Fe2 O3 | 0.14 | 0.003 |
| Mg O | 0.42 | 0.030 |
| K2 O | 0.09 | 0.000 |
| Na2 O | 0.02 | 0.010 |
| Ca CO3 | 9.07 | 0.030 |

TABLE B-continued

| | % by weight of impurities present | |
|---|---|---|
| Impurities present | in the source of semi-hydrated calcium sulfate to be purified | in the recrystallized di-hydrated calcium sulfate in accordance with the invention |
| TOTAL | 12.37 | 0.203 |

*Remark: This apparently high silica (SiO$_2$) content in relation to the other components does not result from the application of the process in accordance with the invention, but from the use of dissolution water initially containing 15 milligrams per liter of dissolved silica (SiO$_2$) at the outset.

The results of the analysis given in Table B serve to affirm the extreme purity of the dihydrated calcium sulfate obtained in accordance with the process of the invention.

Example 2

This example illustrates the capability of the process in accordance with the invention to decrease in a substantial manner the radioactive contamination of the impure hemihydrated calcium sulfate (at the same time as the other impurities are removed).

In practice, impure hemihydrated calcium sulfate coming from the heat treatment of phosphogypsum was placed in solution in an aqueous phase kept under stirring and at a temperature of 15° C. The aqueous solution contained 8.4 grams per liter of calcium sulfate (expressed in dissolved calcium sulfate) and had a pH adjusted to 7.

At the end of the dissolution operation, the aqueous solution of calcium sulfate was separated, by filtration, from the solid insoluble phase formed by the impurities present which were to be removed.

The aqueous solution separated in t his manner was seeded by means of a ground (with a granular cross-section of less than 60 micrometers) gypsum primer (approximately 1.3 grams per liter) in order to initiate the recrystallization of the purified dihydrated calcium sulfate (approximately 6.9 grams per liter outside of the primer at the end of one hour).

The level of radioactive contamination was measured using a BERTHOLD counter equipped with a HARSHAW Model 10 analysis chamber and a DJ 490 detector with a silicon semi-conductor (sold by BERTHOLD, France), both on the phosphogypsum and the corresponding hemihydrated calcium sulfate and on the recrystallized dihydrated calcium sulfate obtained in accordance with the process of the invention and on the impurities separated by filtration. All the results relative to these measurements of the contamination level expressed in Picocuries per gram (pCi/g) are assembled in Table C below.

TABLE C

| | Level of radioactive contamination in pCi/g radiation | |
|---|---|---|
| Sample | Total | Alpha Radium |
| Phosphogypsum | 98 | 21 |
| Phosphoplaster | 100 | 29 |
| Dihydrated calcium sulfate recrystallized in accordance with the invention | 5 | 0 |
| Impurities removed by filtration | 315 | 60 |

Thus, the process in accordance with the provides purified dihydrated calcium sulfate, in which the amount of radioactive contamination has been lowered, in the present case, on the order of 20 times.

Example 3

This example is an illustration of the influence of the size characteristics of the impure hemihydrated calcium sulfate particles on the kinetics of recrystallization of the dihydrated calcium sulfate purified in accordance with the process of the invention.

In practice, impure hemihydrated calcium sulfate (from the region of Le Pin, France) containing 15 percent by weight of impurities underwent a selection and/or grinding operation, such that the particles had, within the framework of four experiments, grain sizes which were well defined in cross-section:

3.1: granular cross-section less than 1,500 micrometers
3.2: granular cross-section less than 800 micrometers
3.3: granular cross-section less than 200 micrometers
3.4: granular cross-section less than 100 micrometers The various grinding and selection operations were carried out in a hammer mill of the FORPLEX No. 2 type (sold by FORPLEX, France), which was provided with a dynamic selector using recirculation which enabled the classification of the particles by size.

After the grinding and/or the selection, the solid ground and/or selected impure hemihydrated calcium sulfate phase was placed into a dissolution vat provided with stirring means and means for adjusting the temperature of the liquid phase. The liquid phase was composed of an aqueous recirculation solution containing 1.8 grams per liter of calcium sulfate expressed as dissolved calcium sulfate, the pH of which was brought to 12 by the addition of sodium hydroxide. Its temperature was maintained at 25° C.

The preparation of each aqueous solution of dissolved calcium sulfate was carried out by producing a suspension of impure hemihydrated calcium sulfate, in accordance with the above-identified grain sizes, in the aqueous recirculation solution, with all the other characteristics remaining identical in the four experiments carried out.

During the formation of the aqueous solution of dissolved calcium sulfate, the aqueous phase was maintained under sufficient stirring to prevent the sedimentation of the impure hemihydrated calcium sulfate and promote its dissolution.

At the end of the dissolution operation, the aqueous solution containing the dissolved calcium sulfate was separated (using a frame filter) from the solid insoluble phase formed by the impurities to be removed.

The aqueous solution of calcium sulfate separated in this manner was seeded using recrystallized gypsum (approximately 0.8 grams per liter) in the form of needles (of a length between 60 micrometers and 80 micrometers) in order to initiate the recrystallization of the dihydrated calcium sulfate, with said primer having been prepared in accordance with Example 2.3 of French Patent Application No. 88-04338.

At the end of the fixed recrystallization time (1 hour and 2 hours), the dihydrated calcium sulfate purified in accordance with the invention was collected.

The characteristics and/or results relative to each experiment have been assembled in the Table D below.

TABLE D

| Experiment No. | Granular cross-section of the impure semi-hydrated calcium sulfate | Dissolution time in minutes of the impure semi-hydrated calcium sulfate | Concentration of the aqueous solution containing the dissolved calcium sulfate expressed in g/l of dissolved calcium sulfate | Recrystallization concentration expressed in g/l of Ca SO4,2H2O recrystallized after: | |
|---|---|---|---|---|---|
| | | | | 1 hour | 2 hours |
| 3.1 | <1500μ | 3 | 5.0 | 2.4 | 3.2 |
| 3.2 | <800μ | 3 | 6.3 | 4.5 | 5.0 |
| 3.3 | <200μ | 3 | 6.6 | 5.2 | 5.7 |
| 3.4 | <100μ | 3 | 6.8 | 5.4 | 5.9 |

The result obtained show that it is possible to optimize the kinetics of recrystallization by changing the granular cross-section of the hemihydrated calcium sulfate used.

Example 4

This example is an illustration of the influence of the temperature of the aqueous phase for dissolution of the impure hemihydrated calcium sulfate on the kinetics of recrystallization of the purified dihydrated calcium sulfate.

In practice, the impure hemihydrated calcium sulfate (from the region of Le Pin, France, containing 15 percent by weight of impurities) underwent a grinding and/or selection operation followed by dissolution in an aqueous recycling solution containing 2.0 grams per liter of dissolved calcium sulfate (the pH of which had been adjusted to 12 by addition of sodium hydroxide) brought to a precise temperature before being subjected to the other steps of the process of the invention.

The various experiments were the following:

4.1 The impure hemihydrated calcium sulfate underwent a grinding/selection operation giving a granular cross-section of less than 200 micrometers, then it was dissolved in the above-identified alkalized aqueous phase, maintained at a temperature of 5° C., before undergoing the other steps of the process.

4.2: The impure hemihydrated calcium sulfate, with the same granular cross-section as that of experiment 4.1, was dissolved in the above-identified alkalized aqueous phase, maintained at a temperature of 15° C, before undergoing the other steps of the process.

4.3: The impure hemihydrated calcium sulfate, with the same granular cross-section as that of experiment 4.1, was dissolved in the above-identified alkalized aqueous phase, maintained at a temperature of 27° C., before undergoing the other steps of the process.

4.4: The impure hemihydrated calcium sulfate, with the same granular cross-section as that of experiment 4.1, was dissolved in the above-identified alkalized aqueous phase, maintained at a temperature of 35° C., before undergoing the other steps of the process.

4.5: The impure hemihydrated calcium sulfate, with the same granular cross-section as that of experiment 4.1, was dissolved in the above-identified alkalized aqueous phase, maintained at a temperature of 40° C., before undergoing the other steps of the process.

At the end of the dissolution (the time of which was fixed at 3 minutes) of the impure hemihydrated calcium sulfate under the above-identified temperature conditions, each aqueous solution was separated from the insoluble solid phase formed by the impurities to be removed.

The five aqueous solutions containing the dissolved calcium sulfate were seeded using a ground gypsum primer (approximately 0.9 grams per liter) having a granular cross-section of less than 60 micrometers in order to initiate the recrystallization of the dihydrated calcium sulfate. After recrystallization times, fixed at 1 hour and 2 hours, the dihydrated calcium sulfate purified in accordance with the invention was collected.

The characteristics and/or results relative to each experiment which are assembled in Table E below, show that the kinetics of recrystallization tend towards an asymptotic value as soon as the temperature exceeds the preferred threshold of 35° C.

TABLE E

| Experiment No. | Temperature of the aqueous solution containing the dissolved calcium sulfate | Concentration of the aqueous solution containing the dissolved calcium sulfate expressed in g/l of dissolved calcium sulfate | Recrystallization concentration expressed in g/l of Ca SO4,2H2O recrystallized after: | |
|---|---|---|---|---|
| | | | 1 hour | 2 hours |
| 4.1 | 5° C. | 7.1 | 2.7 | 4.3 |
| 4.2 | 15° C. | 7.1 | 4.6 | 5.6 |
| 4.3 | 27° C. | 7.1 | 5.9 | 6.3 |
| 4.4 | 35° C. | 7.1 | 6.3 | 6.4 |
| 4.5 | 40° C. | 7.1 | 6.4 | 6.4 |

Example 5

This example illustrates the influence of the concentration of dissolved calcium sulfate on the kinetics of recrystallization of the purified dihydrated calcium sulfate.

For this purpose, impure hemihydrated calcium sulfate (from the heat transformation of gypsum from Le Pin, France, containing 15 percent by weight of impurities) was dissolved in increasing quantities, in appropriate volumes, in an aqueous solution already containing 2.3 grams per liter of calcium sulfate (expressed in dissolved calcium sulfate), thus enabling a simulation of recycling, in the dissolution step, of the aqueous phase resulting from the recrystallization and separation of the purified dihydrated calcium sulfate.

The pH of said recycling solution was maintained at 11.6 by the addition of sodium hydroxide. The temperature of the recycling solution, at the moment of dissolution of the impure hemihydrated calcium sulfate, was 15° C.

After the dissolution and the removal of the impurities through filtration, the aqueous solutions each containing a specific quantity of dissolved calcium sulfate, expressed in grams per liter (experiments 5.1 to 5.4) were seeded, using ground gypsum primers (in an appropriate amount for each one), having a granular cross-section of less than 60 micrometers, in order to initiate the recrystallization of the purified dihydrated calcium sulfate. At the end of recrystallization times fixed at 1 hour and 2 hours, the dihydrated calcium sulfate purified in accordance with the invention was collected.

The characteristics and/or results specific to each experiment which are collected in Table F below show that the kinetics of recrystallization are more rapid when the concentration of dissolved calcium sulfate is higher. That is, the recrystallization rate for higher concentrations of $CaSO_4$ is dramatically higher than for lower concentrations of $CaSO_4$.

TABLE F

| Experiment No. | Concentration of the aqueous solution containing the dissolved calcium sulfate expressed in g/l of dissolved Ca SO4 | Concentration of seeding primers expressed in g/l | Recrystallization concentration expressed in g/l of Ca SO4,2H2O recrystallized after: | |
|---|---|---|---|---|
| | | | 1 hour | 2 hours |
| 5.1 | 5.3 | 0.75 | 1.4 | 2.1 |
| 5.2 | 7.4 | 1.00 | 4.8 | 5.8 |
| 5.3 | 8.1 | 1.10 | 6.1 | 7.1 |
| 5.4 | 8.4 | 1.15 | 6.9 | 7.7 |

Example 6

This example illustrates the influence of the amount of the gypsum primers used on the kinetics of recrystallization of the purified dihydrated calcium sulfate.

For this purpose, impure hemihydrated calcium sulfate containing 15 percent by weight of impurities (from the heat transformation of gypsum from Le Pin, France) was dissolved using a fixed amount of 6.6 grams per liter of calcium sulfate (expressed in dissolved calcium sulfate) in an aqueous solution already containing 1.9 grams per liter of calcium sulfate (expressed in dissolved calcium sulfate), providing the simulation of the recycling in the step of dissolution of the aqueous phase from the recrystallization of the purified dihydrated calcium sulfate.

The pH of the recycling solution was 11.6 (adjusted by the use of sodium hydroxide (NaOH) and the temperature of said solution was maintained at 25° C.

After the dissolution and the removal of the impurities by filtration, the aqueous dissolution solution was used for the preparation of three experiments (6.1 to 6.3) consisting of seeding a volume of the above-identified dissolution solution by means of increasing amounts (specific to each experiment) of gypsum primers with longilinear crystalline structures, with a controlled length and shape factor (obtained in accordance with Example No. 2.3 of French Patent Application No. 88-04338), in order to initiate the recrystallization of the purified dihydrated calcium sulfate.

The crystallization times were fixed at 0.5 hours, 1 hour, 1.5 hours and 2 hours, respectively.

The characteristics and/or results specific to each experiment have been assembled in Table G below.

TABLE G

| Experiment No. | Amount of dissolved calcium sulfate expressed in g/l of Ca SO4 | Amount of seeding primers expressed in g/l of the dissolution solution | Recrystallization concentration (outside of primers) expressed in g/l of Ca SO4,2H2O recrystallized after: | | | |
|---|---|---|---|---|---|---|
| | | | 0.5 h | 1 h | 1.5 h | 2 h |
| 6.1 | 6.6 | 0.9 | 4.4 | 5.2 | 5.5 | 5.7 |
| 6.2 | 6.6 | 4.5 | 5.6 | 5.8 | 5.9 | 5.9 |
| 6.3 | 6.6 | 9.00 | 5.9 | 5.9 | 5.9 | 5.9 |

The results obtained from each experiment show that it is possible to optimize the kinetics of recrystallization by adjusting the amount of pure gypsum primers used to initiate the recrystallization of the purified dihydrated calcium sulfate.

Example 7

Figure 1:
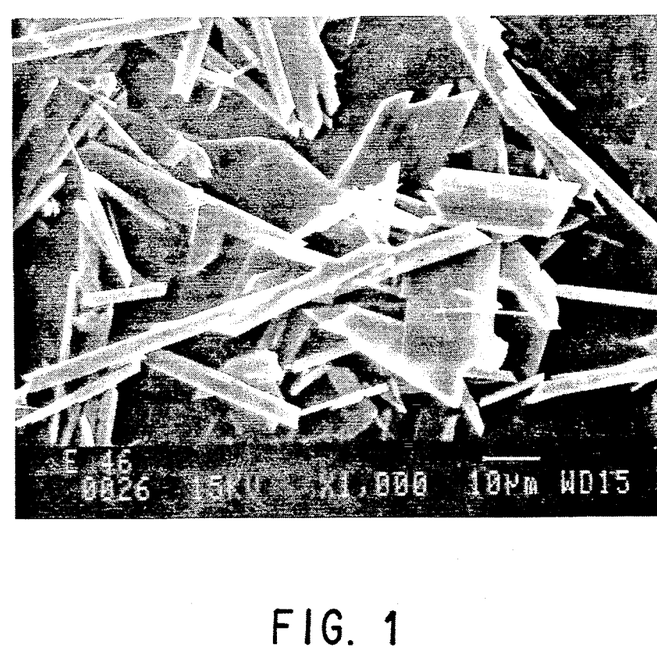
FIG. 1 illustrates polymorphous crystalline calcium sulfate.
Figure 2:
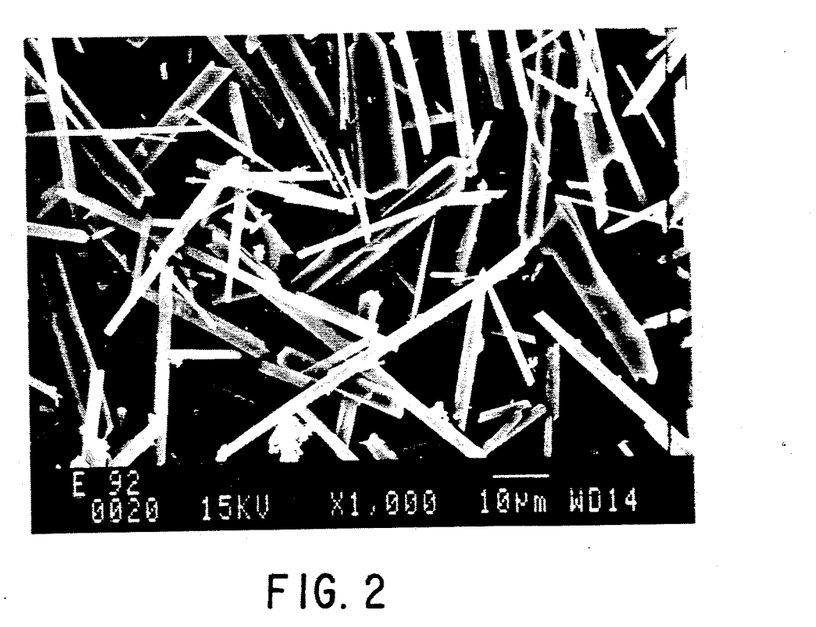
FIG. 2 illustrates longilinear crystalline calcium sulfate.
Figure 3:
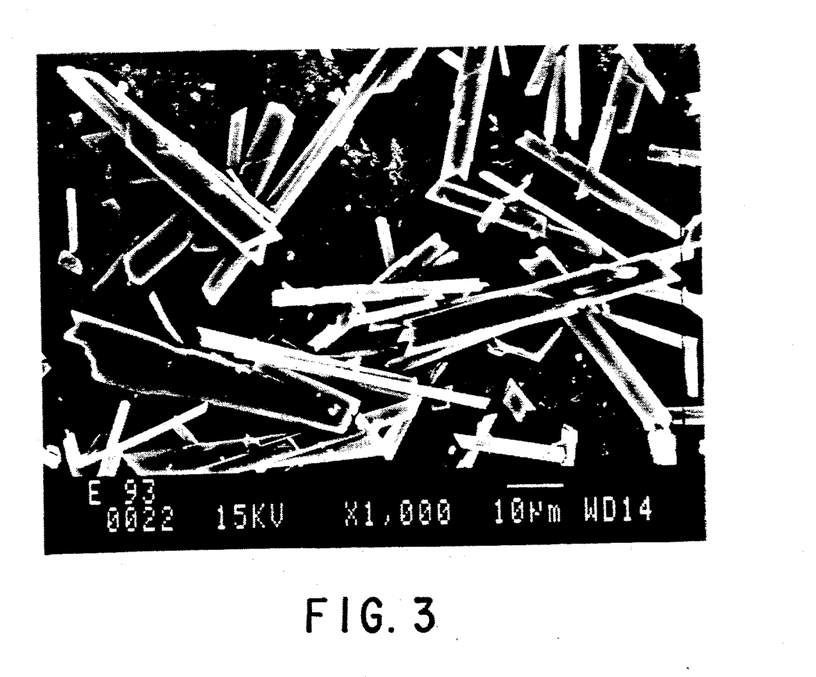
FIG. 3 illustrates longilinear crystalline calcium sulfate.
Figure 4:
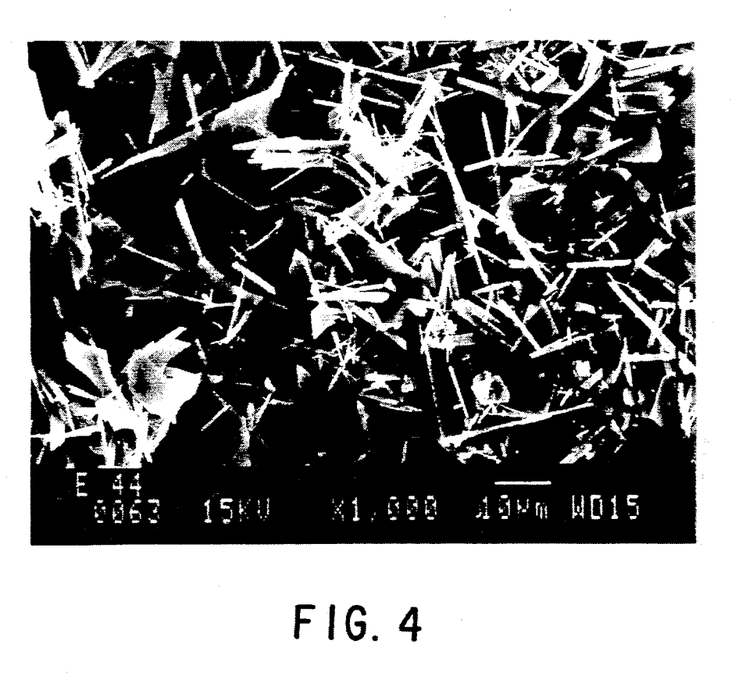
FIG. 4 illustrates polymorphous crystalline calcium sulfate.

Case Illustrated by FIGS. 1, 2 and 3

This example shows the influence of the pH of the solution, which is adjusted by the recrystallization regulating agent, on obtaining longilinear (monomorphous) crystalline structures with a controlled length and form factor.

In practice, impure hemihydrated calcium sulfate (resulting from the heat treatment of gypsum in the region of Le Pin, France, containing 15 percent by weight of impurities) underwent a grinding and/or selection operation (granular cross-section of less than 200 micrometers) following by dissolution at a rate of 6.0 grams per liter expressed in calcium sulfate dissolved in an aqueous solution, maintained under stirring and already containing 1.9 grams per liter of calcium sulfate (expressed in dissolved calcium sulfate). The dissolution and recrystallization temperatures were maintained at 15° C. The pH fixed for each test was maintained constant in both the dissolution and recrystallization steps.

After the steps of dissolution and removal of the impurities by solid/liquid separation, the aqueous solution of calcium sulfate isolated in this manner was seeded by means of 1.3 grams per liter of a gypsum primer with a longilinear crystalline structure, with a controlled length and form factor, obtained in accordance wit Example No. 2.3 of French Patent Application No. 88-04338, in order to initiate the recrystallization of the purified dihydrated calcium sulfate.

After a suitable recrystallization time (1 hour), dihydrated calcium sulfate purified in accordance with the invention was collected.

Three experiments were conducted (experiments 7.1 to 7.3).

7.1: In the case of this experiment, the recrystallization step was carried out at a pH of 8. As shown in FIG. 1 and in spite of seeding with a primer having a longilinear crystalline structure and with a controlled length and shape factor, the pH, which was insufficiently alkaline, led to polymorphous crystalline structures which were well purified but without a controlled length and shape factor.

7.2: In the case of this experiment, the recrystallization step was carried out at a pH of 11.6 by the addition of a controlled amount of an alkaline recrystallization regulating agent (lime).

This experiment, illustrated by FIG. 2, led to purified longilinear crystalline structures (monomorphous) having a controlled length (30/50 micrometers) and shape factor (10/20).

7.3: In the case of this last experiment, the recrystallization step was carried out at pH of 12.5, by the (controlled) addition of the same alkaline recrystallization regulating agent.

This experiment, illustrated by FIG. 3, led to purified longilinear crystalline structures, having a controlled length (30/50 micrometers), equivalent to that of experiment 7.2, and a controlled shape factor (6/10) but which was decreased due to the increase in apparent diameters of the needles.

Example 8

Case Illustrated by FIGS. 4 to 7

This example illustrates the influence of the morphology (length and shape factor) of the seeding primer on obtaining longilinear (monomorphous) crystalline structures with a well controlled length and shape factor, with the recrystallization being carried out in the presence of a regulating agent, which is distinct from the primer, adjusting the pH of the recrystallization solution to a value of between 9 and 12 (except for experiment 8.1).

For this purpose, impure hemihydrated calcium sulfate containing 5 percent by weight of impurities (resulting from the heat transformation of gypsum from Villiers-Adam, France) underwent a selection operation (granular cross-section less than 800 micrometers). At the end of this selection, the impure hemihydrated calcium sulfate was dissolved using a fixed amount with 6.0 grams per liter (expressed in dissolved calcium sulfate) in an aqueous solution already containing 1.9 grams per liter of calcium sulfate (expressed in dissolved calcium sulfate) in solution.

The dissolution and recrystallization temperatures were maintained at 20° C. and the pH adjusted to 1.6 due to the presence of an adequate amount of sodium hydroxide (recrystallization regulating agent).

At the end of the step of dissolution and removal of the impurities by solid/liquid separation, the aqueous dissolution phase was used for the preparation of four experiments (8.1 to 8.4) consisting of seeding, for each experiment, a volume of said solution by means of 0.9 grams per liter of gypsum primers in order to initiate the recrystallization of the purified dihydrated calcium sulfate.

After the recrystallization time which was fixed at 1 hour, the dihydrated calcium sulfate purified in accordance with the invention was collected.

The four experiments were carried out under the following conditions:

8.1: The recrystallization step, illustrated by FIG. 4, was carried out at a pH of 8 in the presence of 0.9 grams per liter of ground natural gypsum primers with a granular cross-section of less than 50 micrometers. The insufficiently alkaline pH of the recrystallization solution led to polymorphous crystalline structures which were purified but which were without a controlled length and shape factor.

8.2: The recrystallization step, illustrated by FIG. 5, was carried out a pH of 11.6 in the presence of 0.9 grams per liter of ground natural gypsum primers with a granular cross-section of less than 50 micrometers.

This experiment led to purified crystalline structures with a longilinear tendency, further comprising undesired crystalline structures (twinned, lance heads, etc.).

8.3: The recrystallization step, illustrated by FIG. 6, was carried out at a pH of 11.6 in the presence of gypsum recrystallization primers with a longilinear crystalline structure having a length within the range of 2 micrometers to 3 micrometers, prepared in accordance with Example 5.4 of French Patent Application No. 88-04338.

Figure 5:
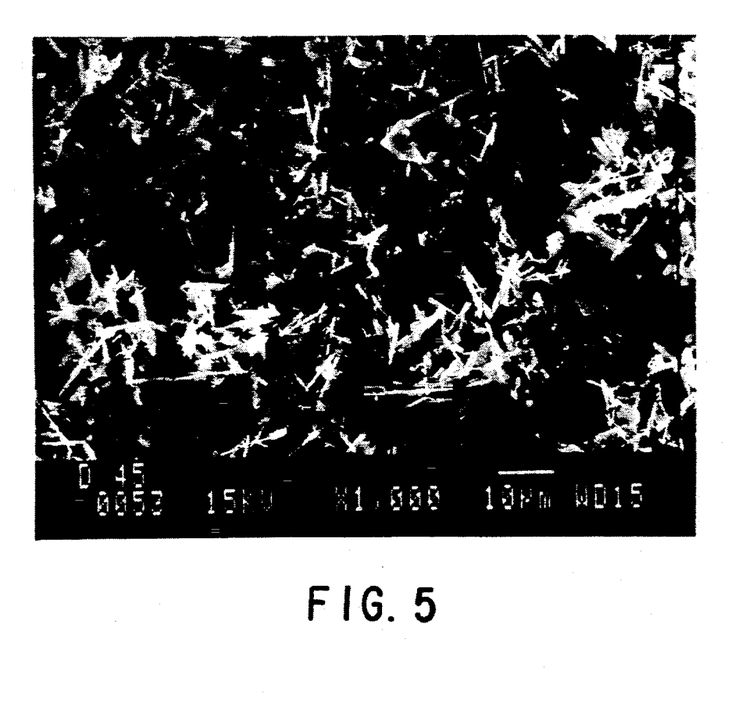
FIG. 5 illustrates calcium sulfate with a longilinear tendency and also containing other crystalline structures.
Figure 6:
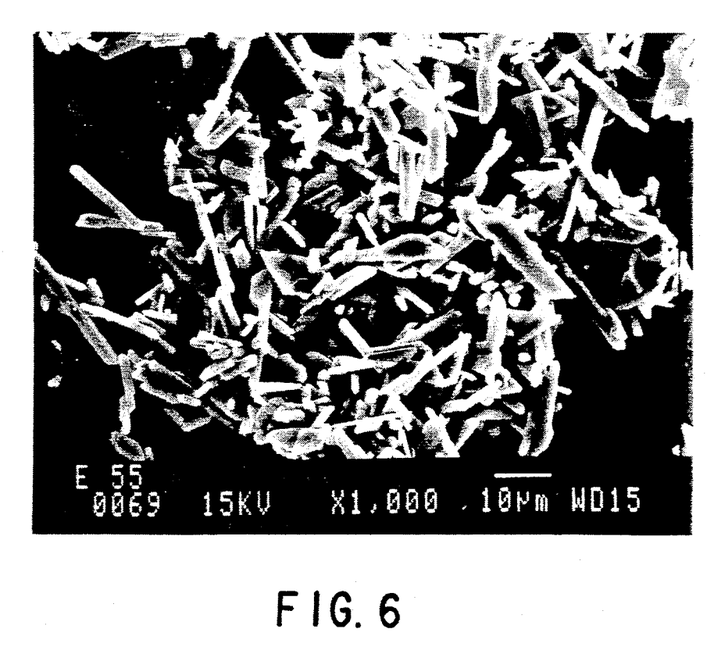
FIG. 6 illustrates longilinear crystalline calcium sulfate.

This experiment led to purified longilinear crystalline structures having an average length (10 micrometers to 25 micrometers) and an average shape factor (from 3 to 8) which were very well controlled in comparison with the crystalline structures obtained in experiment 8.2 (FIG. 5).

8.4: In this last experiment, illustrated by FIG. 7, the recrystallization step was carried out at a pH of 11.6, in the presence of gypsum recrystallization primers having a longilinear crystalline structure with a controlled length within the range of 60 micrometers to 80 micrometers and shape factor (20), prepared in accordance with Example 2.3 of French Patent Application No. 88-04338.

Figure 7:
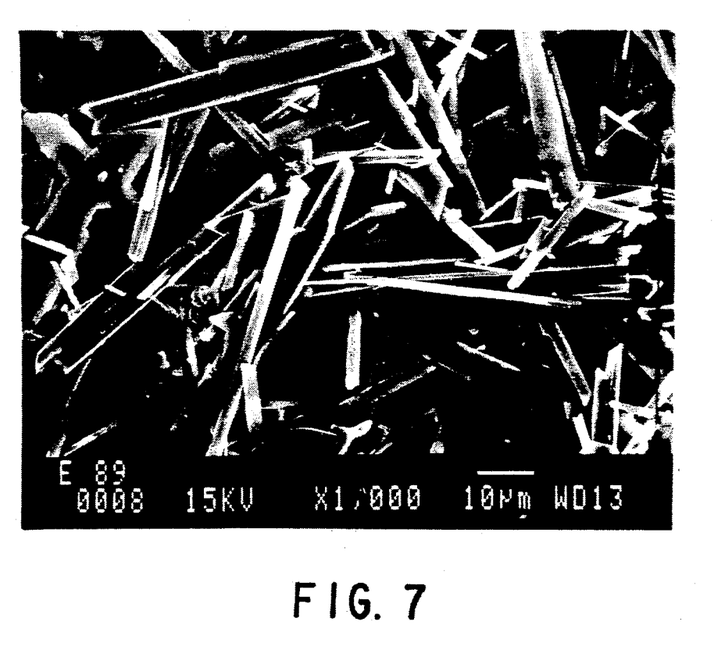
FIG. 7 illustrates longilinear crystalline calcium sulfate.

This experiment led to the recrystallization of purified longilinear crystalline structures, having a controlled average length (from 40 micrometers to 60 micrometers) and average shape factor (9 to 27), which was further increased in relation to the shape factors of the above-identified experiments.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for the preparation of purified calcium sulfate, with high whiteness, having longilinear monomorphous crystalline structures, comprising:
   a) forming an aqueous solution by dissolution of impure hemihydrated calcium sulfate, at a concentration at most of 13.0 grams per liter (expressed in dissolved $CaSO_4$) and at a pH of 9–13;

b) separating the aqueous solution containing the dissolved calcium sulfate from any insoluble solid phase formed by impurities to be removed, c) recrystallizing the purified calcium sulfate in dihydrated form from the aqueous solution resulting from step (b), to obtain a solid phase composed of recrystallized purified calcium sulfate having an average length of between 2 micrometers and 200 micrometers and a shape factor within the range 2/1 to 50/1, and an aqueous phase poor in dissolved calcium sulfate, d) separating said aqueous phase poor in dissolved calcium sulfate from said solid phase composed of the recrystallized purified calcium sulfate, and e) recycling the aqueous phase poor in dissolved calcium sulfate back to step (a) for dissolving impure calcium sulfate.

2. The process for preparation in accordance with claim 1, wherein the particles of impure hemihydrated calcium sulfate of step (a) have a granular cross-section of 10,000 micrometers at most.

3. The process for preparation in accordance with claim 1, wherein the particles from the source of impure hemihydrated calcium sulfate of step (a) are subjected to a grinding or selection operation such that they have a specific granular cross-section selected within the range of 5 micrometers to 500 micrometers.

4. The process for preparation in accordance with claim 1, wherein said impure hemihydrated calcium sulfate is at a temperature within the range of 150° C. to 15° C.

5. The process for preparation in accordance with claim 1, wherein the concentration of dissolved calcium sulfate in the aqueous dissolution solution of step (d) is preferably between 11 grams per liter and 6 grams per liter of dissolved calcium sulfate.

6. The process for preparation in accordance with claim 1, wherein the dissolution temperature is at most 70° C.

7. The process for preparation in accordance with claim 1, wherein a recrystallization retarding agent is added during dissolution step (a).

8. The process for preparation in accordance with claim 7, wherein the recrystallization retarding agent is selected from the group consisting of hydrolyzed proteins, water soluble carboxylic acids and their salts, phosphonic, phosphoric and sulfonic acids and their salts, and glucoses.

9. The process for preparation in accordance with claim 1, wherein the undissolved solid phase resulting from the separation of the aqueous phase containing the dissolved calcium sulfate of step (b) is recycled into dissolution step (a).

10. The process for preparation in accordance with claim 1, wherein the dissolution of the impure hemihydrated calcium sulfate is carried out in successive steps.

11. The process for preparation in accordance with claim 10, wherein each dissolution step is followed by a liquid/solid separation step.

12. The process for preparation in accordance with claim 1, wherein a seeding primer selected from the group consisting of calcium sulfates, calcium and potassium double sulfate, calcium and ammonium double sulfate, calcium trisulfoaluminate, and moistures thereof is added to the aqueous recrystallization solution resulting from step (b).

13. The process for preparation in accordance with claim 12, wherein the seeding primer has a polymorphous structure.

14. The process for preparation in accordance with claim 12, wherein the seeding primer has a longilinear crystalline structure.

15. The process for preparation in accordance with claim 12, wherein a recrystallization regulating agent which is different from said seeding primer selected from the group consisting of (a) neutral agents selected from the group consisting of the halogenides, sulfates, nitrates, silicates, and halogensilicates of a member selected from the group consisting of lithium, sodium, potassium, ammonium, calcium, magnesium and aluminum; and (b) alkaline agents selected from the group consisting of alkali metal hydroxides, amonium hydroxide, alkaline-earth metal hydroxides, aluminous cements, alkaline aluminates, aluminosilicates, and mixtures thereof is added to the recrystallization reaction medium.

16. The process for preparation in accordance with claim 15, wherein the recrystallization regulating agent has a chemically neutral character and is selected from the group consisting of the halogenides, sulfates, nitrates, silicates, and halogensilicates of a member selected from the group consisting of lithium, sodium, potassium, ammonium, calcium, magnesium and aluminum.

17. The process for preparation in accordance with claim 15, wherein the recrystallization regulating agent has a chemically alkaline character and is selected from the group consisting of alkali metal hydroxides, ammonium hydroxide, alkaline-earth metal hydroxides, magnesium hydroxide, calcium hydroxide, Portland cements, aluminous cements, calcium aluminate, alkaline aluminates, aluminosilicates, and mixtures thereof.

18. The process for preparation in accordance with claim 15, wherein said recrystallization regulating agent comprises at least two recrystallization regulating agents from (a) neutral agents and (b) alkaline agents.

19. The process for preparation in accordance with claim 15, wherein the recrystallization regulating agent is added to the aqueous recrystallization solution at a rate of 0.01 grams per liter to 3.0 grams per liter and preferably from 0.1 grams per liter to 0.75 grams per liter.

20. The process of claim 15, wherein said alkaline agent is magnesium hydroxide, calcium hydroxide, Portland cement, calcium aluminate and mixtures thereof.

21. The process for preparation in accordance with claim 1, wherein the temperature of the recrystallization solution is 0° to 50° C.

22. The process for preparation in accordance with claim 1, wherein the purified crystalline structures obtained from separation step (d) are subjected to a heat treatment at 90° C. to 250° C.

23. The process of claim 22, wherein the heat treatment is drying.

24. The process of claim 22, wherein the heat treatment is carried out at a temperature of between 90° C. and 250° C.

25. The process of claim 22, wherein the heat treatment is carried out at a temperature of at least 250° C. to obtain anhydrite II.

26. The process of claim 22, wherein the heat treatment is carried out at a temperature of at least 1200° C. to obtain anhydrite I.

27. The process for preparation in accordance with claim 1, wherein the purified crystalline structures obtained from separation step (d) are subjected to a heat treatment of at least 250°.

28. The process for preparation in accordance with claim 1, wherein the purified crystalline structures obtained from separation step (d) are subjected to a heat treatment of at least 1200°.

* * * * *

UNITED STATES PATENT AND TRADEMARK OFFICE
CERTIFICATE OF CORRECTION

PATENT NO. : 5,173,284

DATED : DECEMBER 22, 1992

INVENTOR(S) : JACQUES MOISSET

It is certified that error appears in the above-identified patent and that said Letters Patent is hereby corrected as shown below:

Column 19, line 60, "1.6" should read --11.6--.

Column 21, line 63, Claim 12, "moistures" should read --mixtures--.

Signed and Sealed this

Twenty-ninth Day of March, 1994

Attest:

BRUCE LEHMAN

*Attesting Officer*   *Commissioner of Patents and Trademarks*